US012601221B1

(12) United States Patent
Chen

(10) Patent No.: US 12,601,221 B1
(45) Date of Patent: Apr. 14, 2026

(54) LADDER THAT FACILITATES THE CONTRACTION OF HANDRAILS

(71) Applicant: Miaoren Chen, Jinhua (CN)

(72) Inventor: Miaoren Chen, Jinhua (CN)

( * ) Notice: Subject to any disclaimer, the term of this patent is extended or adjusted under 35 U.S.C. 154(b) by 0 days.

(21) Appl. No.: 19/321,107

(22) Filed: Sep. 5, 2025

(51) Int. Cl.
*E06C 1/22* (2006.01)
*E06C 7/04* (2006.01)
*E06C 7/50* (2006.01)

(52) U.S. Cl.
CPC .................. *E06C 1/22* (2013.01); *E06C 7/04* (2013.01); *E06C 7/50* (2013.01)

(58) Field of Classification Search
CPC ........................................................ E06C 1/22
See application file for complete search history.

(56) References Cited

U.S. PATENT DOCUMENTS

| | | | | |
|---|---|---|---|---|
| 5,074,378 A * | 12/1991 | Studer | E06C 1/22 | 182/201 |
| 5,305,851 A * | 4/1994 | Katson | E06C 1/22 | 182/204 |
| 6,220,389 B1 * | 4/2001 | Krause | E06C 1/12 | 182/163 |
| 6,698,550 B2 * | 3/2004 | Crain | E06C 1/22 | 182/201 |
| 7,104,362 B2 * | 9/2006 | Meeker | E06C 7/50 | 182/161 |
| 7,383,920 B2 * | 6/2008 | Meeker | E06C 7/14 | 182/129 |
| 8,056,679 B2 * | 11/2011 | Hong | E06C 1/12 | 182/195 |
| 8,186,481 B2 * | 5/2012 | Moss | E06C 7/06 | 182/25 |
| 9,016,434 B2 * | 4/2015 | Moss | E06C 7/50 | 182/180.1 |
| 10,844,660 B2 * | 11/2020 | Leng | E06C 1/387 | |
| 11,319,751 B2 * | 5/2022 | Zhu | E06C 1/22 | |
| 11,578,533 B2 * | 2/2023 | Fortier | F16B 7/105 | |
| 11,753,868 B2 * | 9/2023 | Boyer | E06C 7/182 | 182/106 |

(Continued)

FOREIGN PATENT DOCUMENTS

| | | | |
|---|---|---|---|
| CN | 206376733 U * | 8/2017 | E06C 1/387 |
| CN | 111963046 A * | 11/2020 | E06C 7/50 |

(Continued)

*Primary Examiner* — Brian D Mattei
*Assistant Examiner* — Kathleen M. McFarland
(74) *Attorney, Agent, or Firm* — Birchwood IP

(57) ABSTRACT

A ladder that facilitates a contraction of handrails is provided. The ladder includes a front tube and a rear tube hinged to each other; an armrest frame sleeved on the front tube, a vertical rod of the armrest frame is inserted into the front tube and slides in cooperation with it; an elastic locking member that cooperates with the vertical rod, the elastic locking member can expand and contract elastically in a radial direction of the vertical rod, thereby achieving fixation or unlocking between the front tube and the vertical rod; an unlocking member provided on the front or rear tube; when the front tube and rear tube are folded, the unlocking member acts on the elastic locking member, the elastic locking member is caused to release a locking state of the front tube and the vertical rod, thereby achieving automatic contraction of the armrest frame.

5 Claims, 10 Drawing Sheets

(56) References Cited

U.S. PATENT DOCUMENTS

| | | | | |
|---|---|---|---|---|
| 11,788,354 | B2 * | 10/2023 | Moss | E06C 7/10 182/24 |
| 11,821,262 | B2 * | 11/2023 | Zhu | E06C 1/22 |
| 2003/0188926 | A1 * | 10/2003 | Crain | E06C 7/44 182/166 |
| 2004/0000449 | A1 * | 1/2004 | Meeker | E06C 1/387 182/165 |
| 2005/0186023 | A1 * | 8/2005 | Lee | F16B 7/105 403/109.3 |
| 2009/0229918 | A1 * | 9/2009 | Moss | E06C 7/14 182/180.1 |
| 2011/0036666 | A1 * | 2/2011 | Hong | E06C 1/12 182/209 |
| 2012/0211305 | A1 * | 8/2012 | Moss | E06C 1/39 182/180.1 |
| 2015/0068842 | A1 * | 3/2015 | Moss | E06C 7/423 292/341.15 |
| 2017/0175442 | A1 * | 6/2017 | Myers | E06C 1/18 |
| 2018/0148977 | A1 * | 5/2018 | Leng | E06C 1/393 |
| 2020/0011133 | A1 * | 1/2020 | Moss | E06C 1/18 |
| 2020/0217134 | A1 * | 7/2020 | Fortier | E06C 1/22 |
| 2020/0240207 | A1 * | 7/2020 | Zhu | E06C 7/04 |
| 2020/0240209 | A1 * | 7/2020 | Zhu | E06C 1/22 |
| 2021/0010327 | A1 * | 1/2021 | Boyer | E06C 1/393 |
| 2022/0025704 | A1 * | 1/2022 | Bibler | E06C 1/22 |
| 2023/0287739 | A1 * | 9/2023 | Dong | E06C 1/18 |
| 2024/0141729 | A1 * | 5/2024 | Leng | E06C 7/182 |
| 2024/0301752 | A1 * | 9/2024 | Leng | E06C 1/20 |
| 2025/0084699 | A1 * | 3/2025 | Chen | E06C 7/06 |

FOREIGN PATENT DOCUMENTS

| | | | | |
|---|---|---|---|---|
| CN | 213682919 | U * | 7/2021 | |
| DE | 202004002426 | U1 * | 7/2004 | A45B 25/02 |
| WO | WO-2008041156 | A2 * | 4/2008 | E06C 7/423 |

* cited by examiner

LADDER THAT FACILITATES THE CONTRACTION OF HANDRAILS

CROSS-REFERENCE TO RELATED APPLICATIONS

This application claims priority to Chinese Patent Application No. 202521791912.5, filed on Aug. 22, 2025, which is hereby incorporated by reference in its entirety.

TECHNICAL FIELD

The present disclosure relates to the field of ladder technologies, and in particular, to a ladder that facilitates the contraction of handrails.

BACKGROUND

The existing ladder handrail structure achieves unlocking between a handrail body and a ladder body by inserting the handrail body into the ladder body and pulling a lock buckle between the two by a user. Every time the armrest needs to be contracted, the user needs to pull the lock buckle, which causes inconvenience to the user.

SUMMARY

To address the shortcomings of existing technology, a ladder that can facilitate a contraction of handrails is provided.

The present disclosure adopts the following technical solution for implementation: a ladder that facilitates a contraction of handrails, including:

- a front tube and a rear tube that are hinged to each other at a top to form a zigzag folding structure;
- an armrest frame, which is sleeved on the front tube, and a vertical rod of the armrest frame is inserted into the front tube and slides in cooperation with the front tube;
- an elastic locking member that cooperates with the vertical rod, the elastic locking member can expand and contract elastically in a radial direction of the vertical rod, thereby achieving fixation or unlocking between the front tube and the vertical rod; and
- an unlocking member, which is provided on the front tube or the rear tube;
- when the front tube and the rear tubes are folded, the unlocking member acts on the elastic locking member to cause the elastic locking member to release a locking state of the front tube and the vertical rod, thereby achieving automatic contraction of the armrest frame.

When using the ladder, after the ladder is unfolded, the handrail is pulled out directly upwards, so that the elastic locking member passes through both the front tube and the vertical rod, and the handrail and front tube can be fixed. When the ladder is not needed, the ladder is simply folded and closed. After the front and rear tubes are closed, the unlocking member acts on the elastic locking member, and the elastic locking member is unlocked, thereby releasing the locking state between the front tube and the armrest frame and achieving automatic contraction of the armrest frame.

By providing the unlocking member on the front tube or the rear tube, so that when the front tube and the rear tube are folded, the unlocking member will automatically unlock the elastic locking member. Compared with the existing solution, a user does not need to pull or press the elastic locking member, which is very convenient.

In some embodiments of the present disclosure, the front tube and the rear tube are arranged to overlap in a front-and-rear direction, the elastic locking member includes a locking protrusion and an elastic member, both the front tube and the vertical rod are provided with locking holes configured for the locking protrusion to pass through, and the unlocking member is provided on the front tube, where the unlocking member includes:

- a fixing part, which is fixed on an outer wall of the front tube and is provided with a sliding groove having an opening towards the rear tube;
- a movable part, which is slidably fit inside the sliding groove and wraps around an outer circumference of the front tube;
- in a natural state, the elastic member applies elastic force to both the locking protrusion and the movable part, the locking protrusion is caused to pass through the locking holes of the front tube and the vertical rod, and the movable part is caused to move towards the rear tube;
- when the front tube and rear tube are folded and closed, the rear tube compresses the movable part, and the locking protrusion is caused to exit from the locking holes of the front tube or/and the vertical rod to release a locking state of the armrest frame and the front tube.

Where the movable part is wrapped around the outer circumference of the front tube and has a slot hole configured for the front tube to pass through. A diameter of the slot hole is larger than that of the front tube, so that the movable part has a movable space in the sliding groove.

In some embodiments of the present disclosure, the elastic locking member is provided inside the vertical rod, and the elastic member directly applies elastic force to the locking protrusion, so that the locking protrusion passes through the locking holes of the front tube and the vertical rod, and contacts the movable part, the movable part is caused to move towards the rear tube; an inner wall of a rear side of the movable part is provided with an unlocking protrusion that contacts the locking protrusion;

- when the front tube and the rear tube are folded and closed, the rear tube compresses the movable part, the unlocking protrusion is caused to extend into the locking holes, and the locking protrusion is caused to at least exit from the locking holes of the front tube.

In some embodiments of the present disclosure, the locking protrusion is fixedly provided on an inner wall of a front side of the movable part, the elastic member is provided between the front tube and an inner wall of a rear side of the movable part; two ends of the elastic member are respectively in contact with an outer wall of the front tube and the inner wall of the rear side of the movable part, thereby directly applying elastic force to the movable part and cause the movable part to move toward the rear tube, so that the locking protrusion is inserted into the locking holes of the front tube and the vertical rod from front to rear;

- when the front tube and the rear tube are folded and closed, the rear tube compresses the movable part, the locking protrusion is caused to at least exit from the locking holes of the vertical rod.

In some embodiments of the present disclosure, the front tube and rear tube are arranged to overlap in a front-and-rear direction, the elastic locking member is provided on the vertical rod, the front tube and vertical rod are provided with locking holes configured for the elastic locking member to pass through, and the unlocking member is an unlocking protrusion provided on an outer wall surface of the rear tube that faces the front tube; the unlocking protrusion is provided on a rotation path of the locking holes; when the front tube and rear tube are folded, the unlocking protrusion enters the locking holes to cause the elastic locking member to at least exit from the locking holes of the front tube, thereby releasing a locking state of the handrail frame and front tube.

In some embodiments of the present disclosure, the front tube and the rear tube are arranged in a staggered manner in a front-and-rear direction, the elastic locking member is provided on the vertical rod; the front tube and the vertical rod are provided with locking holes configured for the elastic locking member to pass through; the rear tube is provided with an extension portion that overlaps with the front tube in the front-and-rear direction, and the extension portion is provided with the unlocking member, and the unlocking member is an unlocking protrusion; when the front tube and the rear tube are folded, the unlocking protrusion enters the locking holes, and the elastic locking member is caused to at least exit from the locking holes of the front tube to release a locking state of the armrest frame and the front tube.

When the front tube is provided on the inner side of the rear tube, the extension part is further provided on an inner wall of the rear tube; when the front tube is provided on the outer side of the rear tube, the extension is provided on the outer wall of the rear tube.

In some embodiments of the present disclosure, the front tube is provided with a foot pedal, and the rear tube is provided with a support plate that supports the foot pedal when the ladder is unfolded; where the support plate forms the extension part, and the unlocking member is provided on the support plate.

Through the above settings, the structure can be more compact and production costs can be saved.

In some embodiments of the present disclosure, the handrail frame is a single tube handrail frame or a double tube handrail frame.

Compared with the existing technology, the beneficial effect of the present disclosure is that by providing the unlocking member on the front tube or rear tube, the unlocking member will automatically unlock the elastic locking member when the front and rear tubes are folded. Compared with the existing technology, there is no need for the user to pull or press the elastic locking member, which is very convenient.

Numeral reference: 1—front tube; 11—foot pedal; 12—locking hole; 2—rear tube; 3—armrest frame; 31—vertical rod; 4—connection rod; 5—support plate; 6—unlocking member; 61—unlocking protrusion; 62—fixing part; 621—sliding groove; 63—movable part; 7—elastic locking member; 71—locking protrusion; 72—elastic member.

DESCRIPTION OF EMBODIMENTS

Below is a further description of the present disclosure based on the accompanying drawings and specific embodiments.

Figure 1:
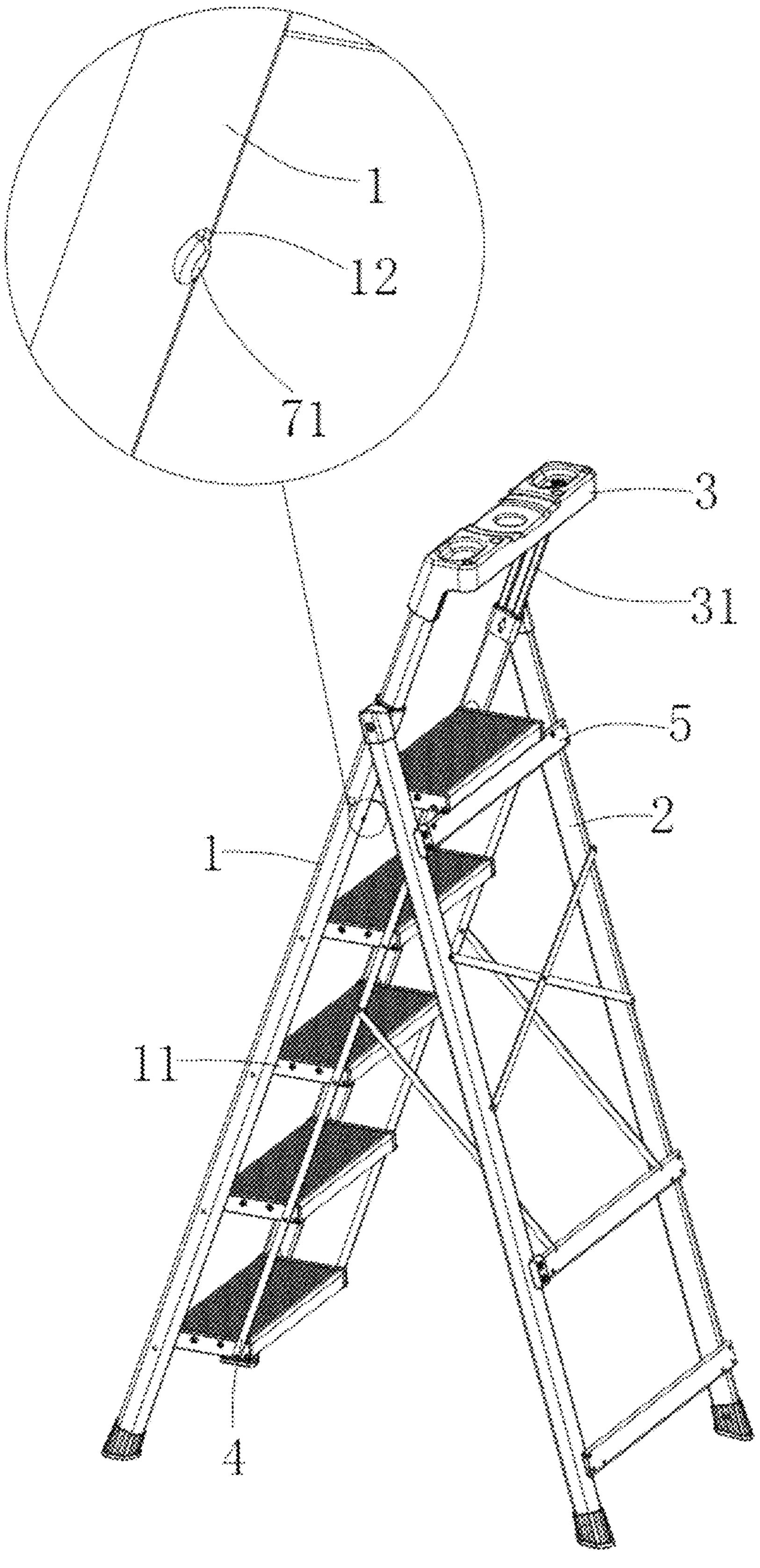
FIG. 1 is a schematic structure diagram of a ladder when unfolded.
Figure 2:
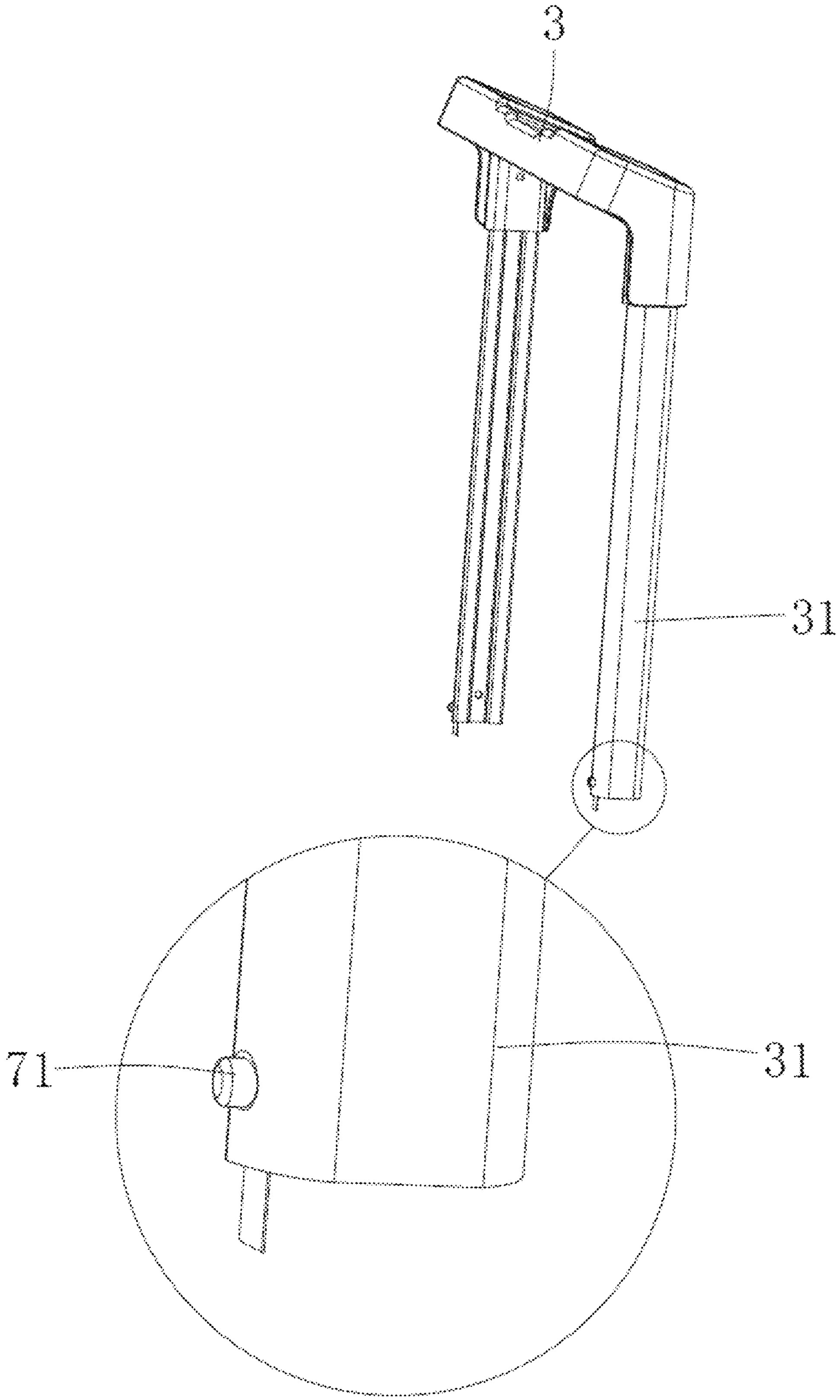
FIG. 2 is a schematic structure diagram of an armrest frame.
Figure 3:
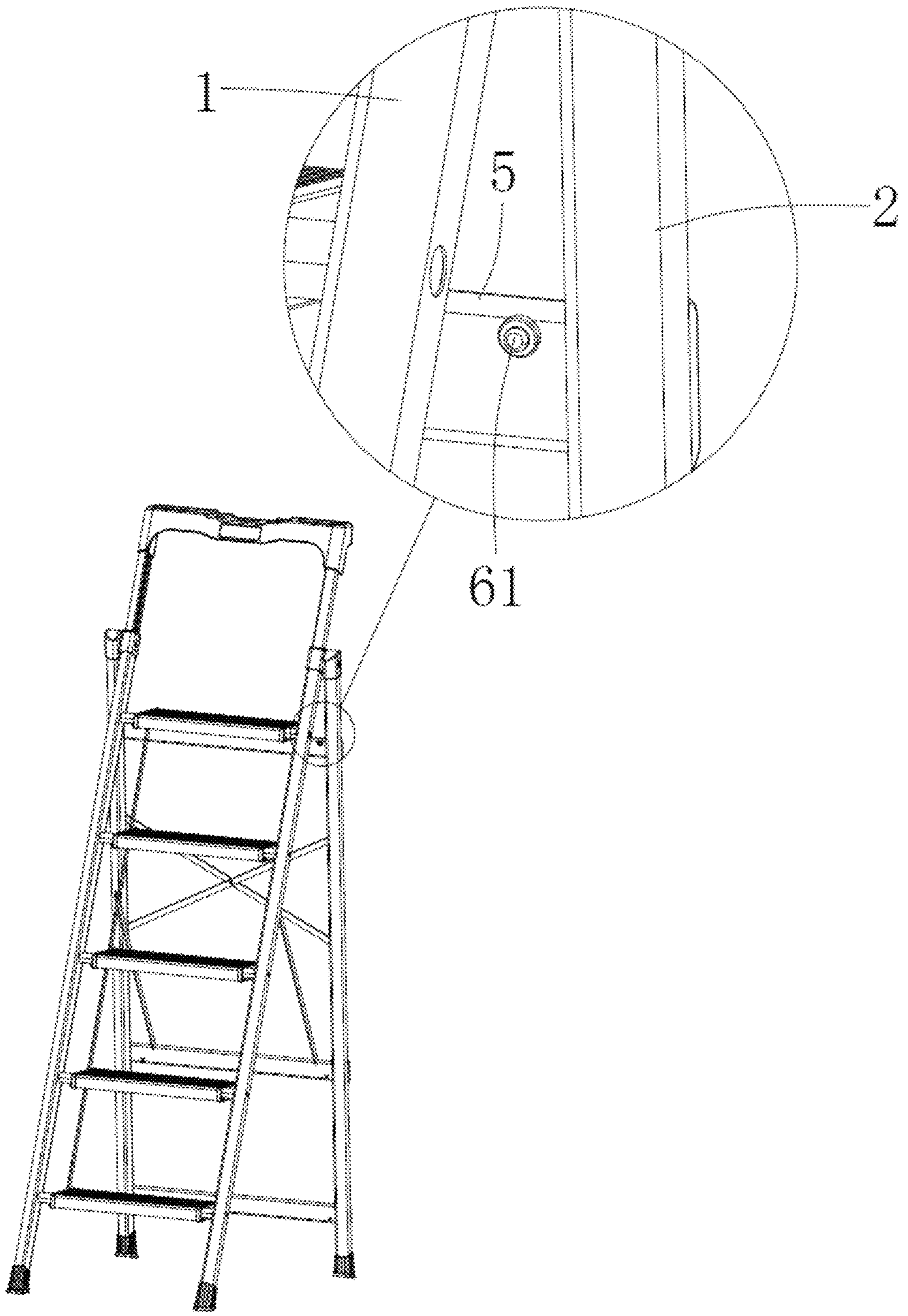
FIG. 3 is a schematic structure diagram of the ladder when unfolded from another perspective view in an embodiment.
Figure 4:
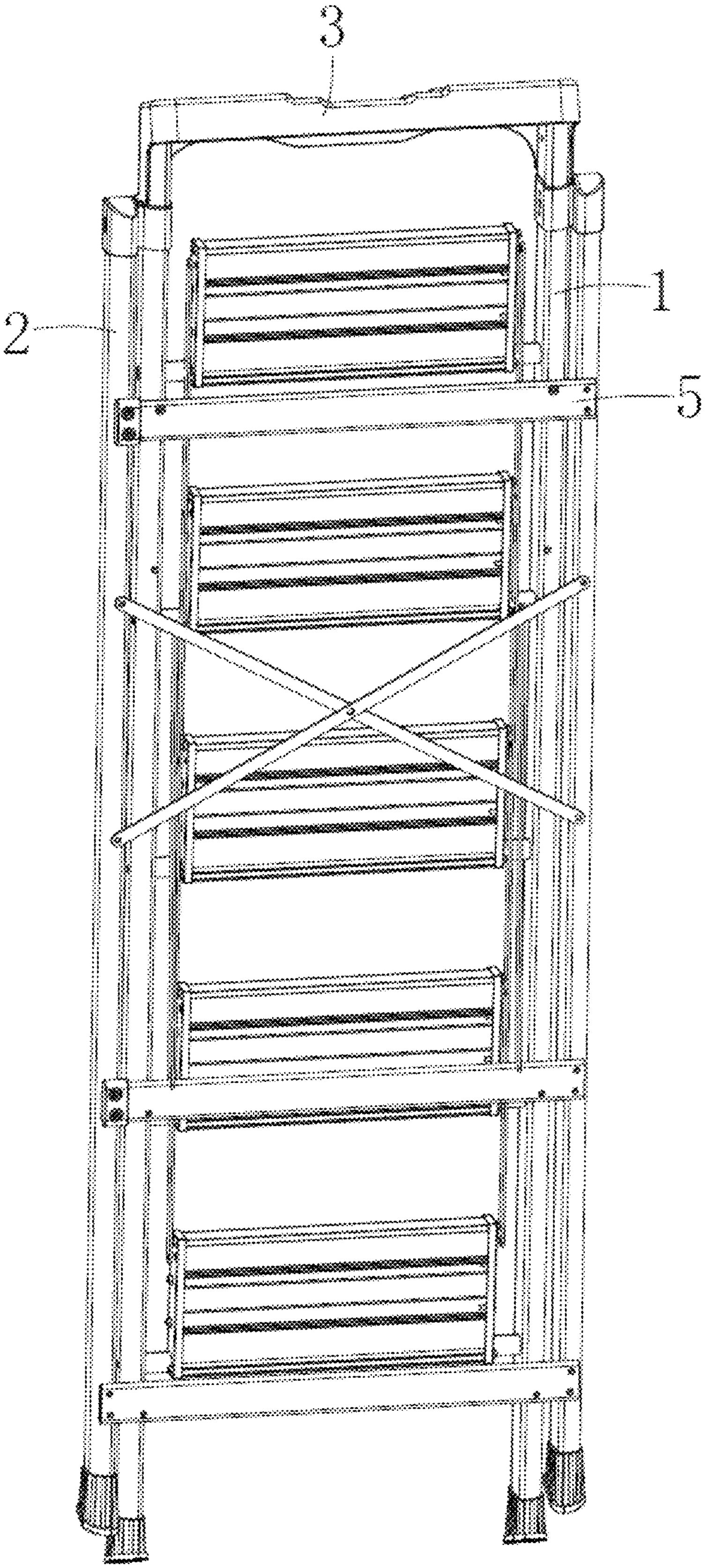
FIG. 4 is a schematic structure diagram of the ladder when folded and closed in an embodiment.
Figure 5:
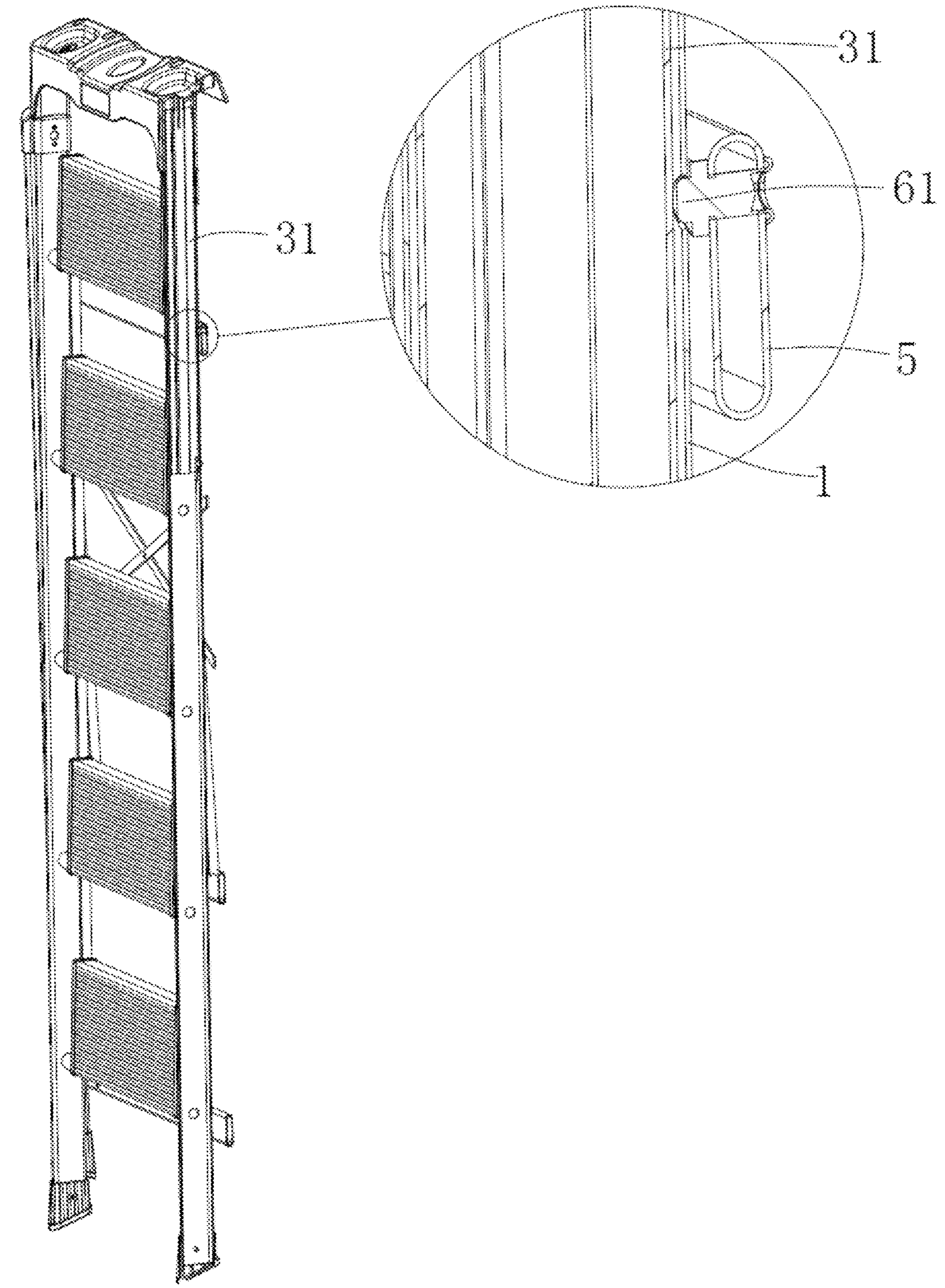
FIG. 5 is a sectional view of the ladder when folded and closed in an embodiment.
Figure 6:
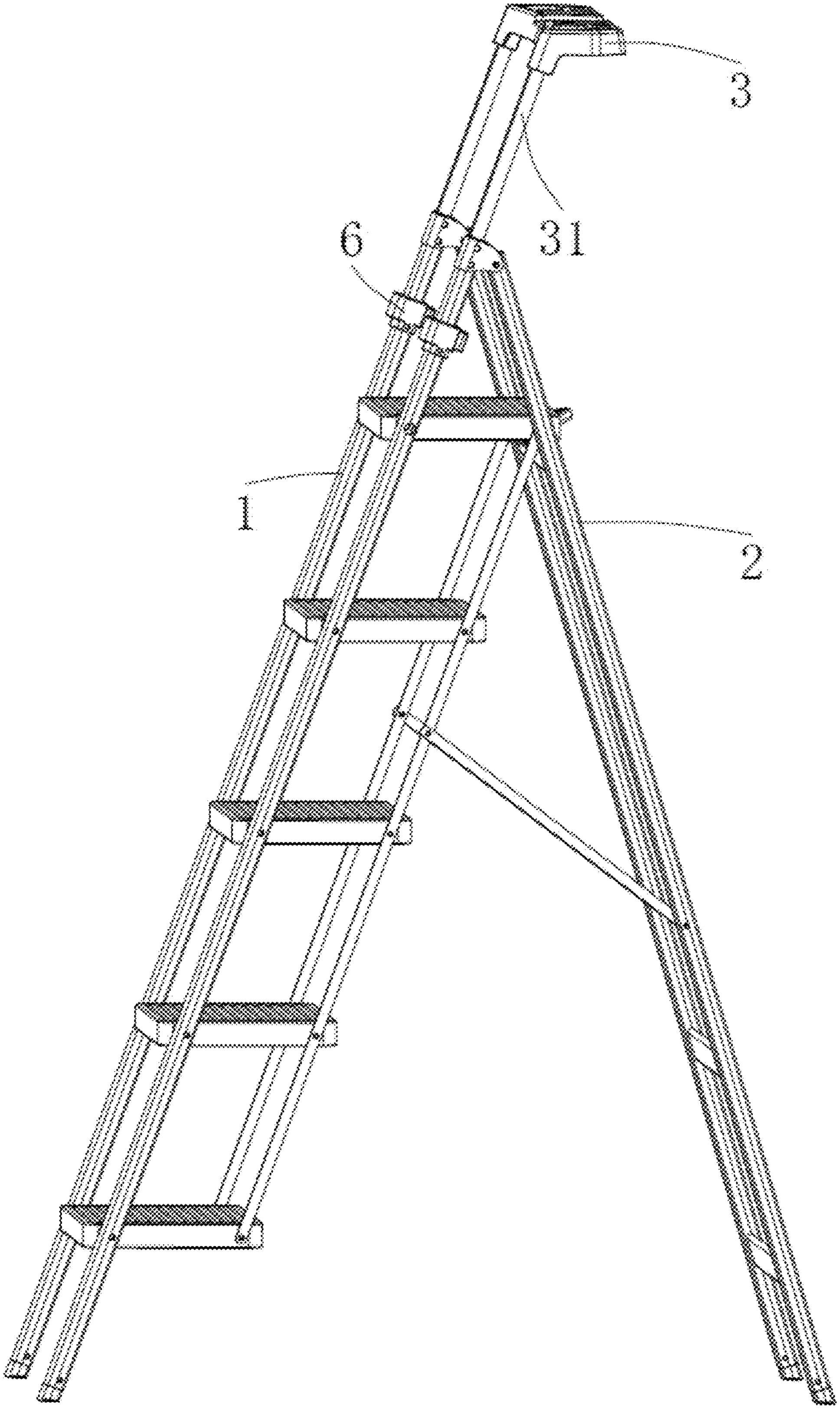
FIG. 6 is a schematic structure diagram of another embodiment.
Figure 7:
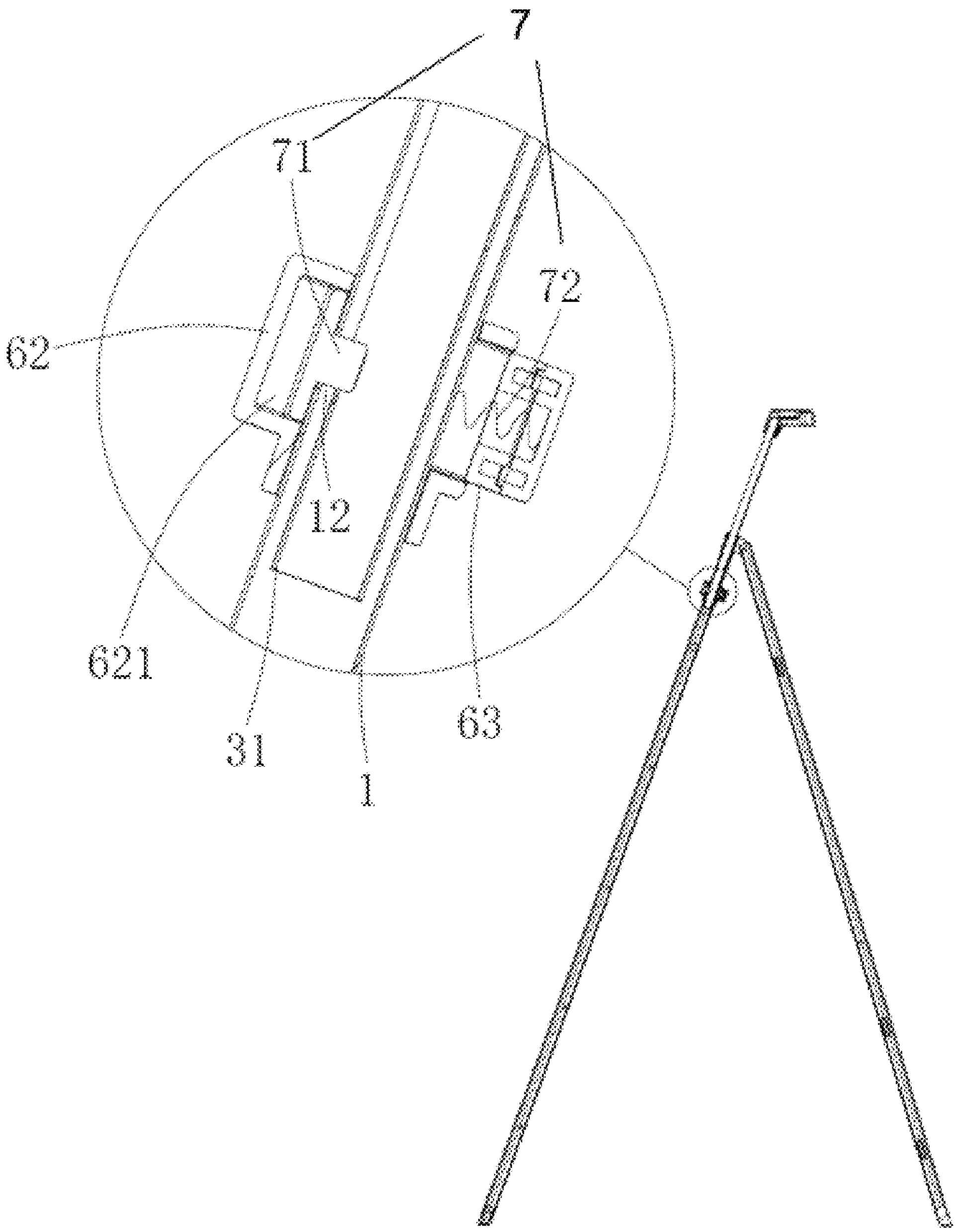
FIG. 7 is a sectional view of FIG. 6.
Figure 8:
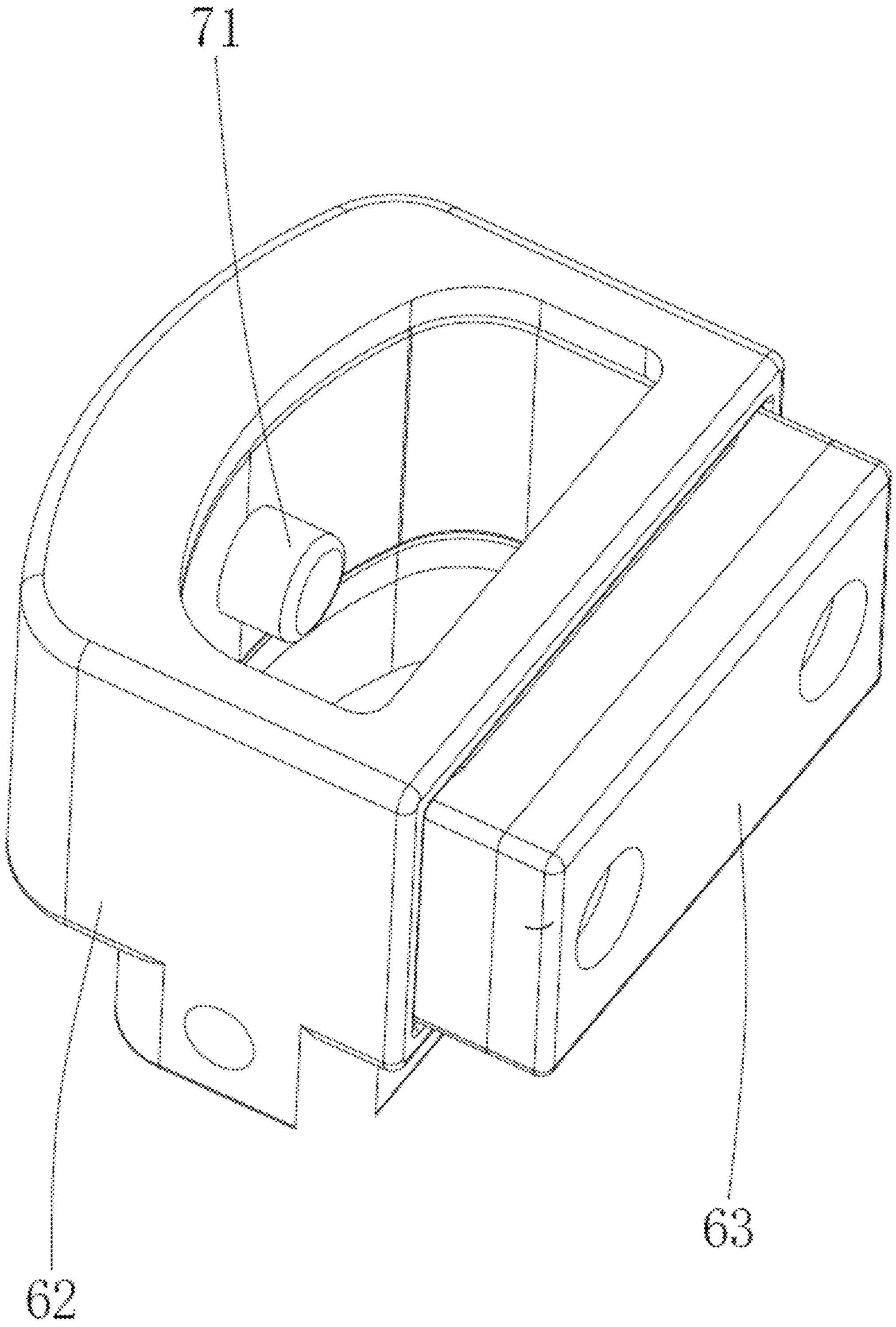
FIG. 8 is a schematic structure diagram of an unlocking member.
Figure 9:
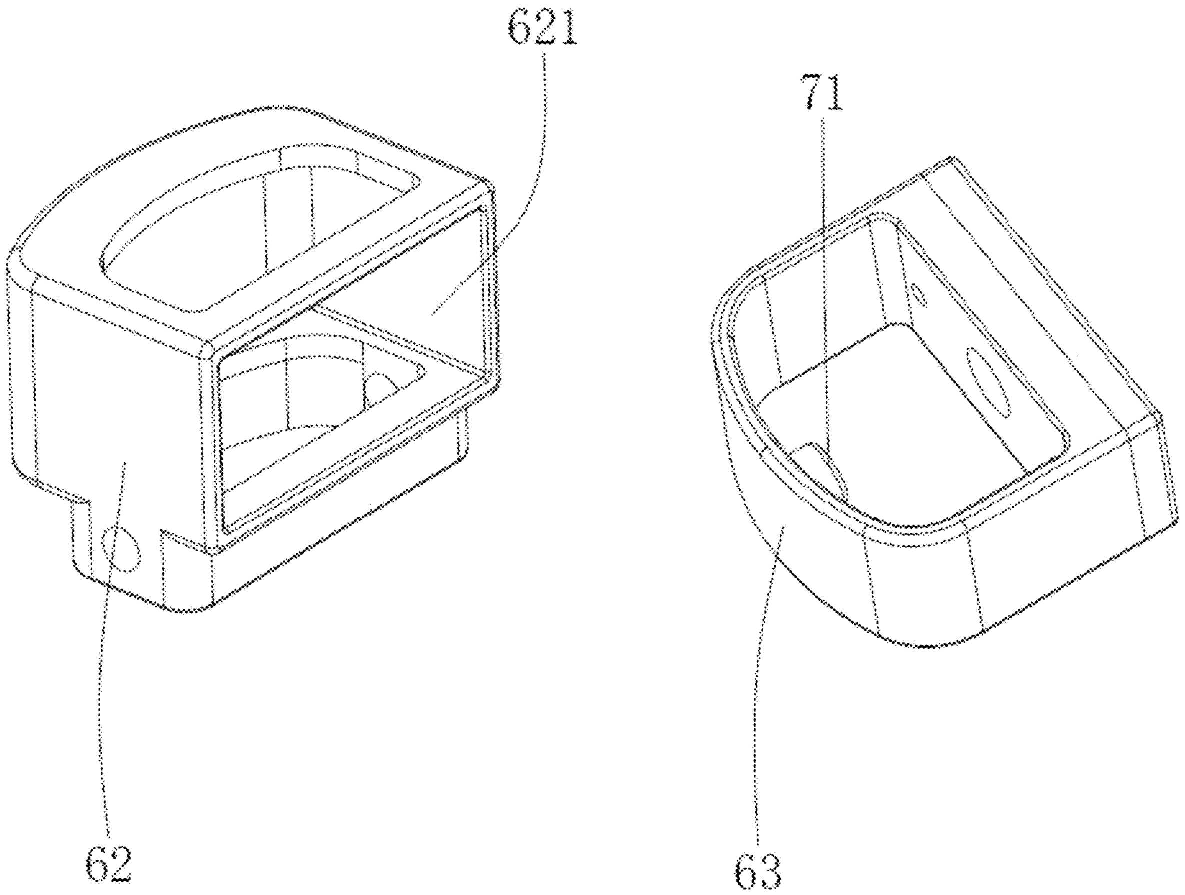
FIG. 9 is a schematic structure diagram of a movable part and a fixing part of the unlocking member in FIG. 8.

As shown in FIG. 1, this embodiment discloses a ladder that facilitates a contraction of handrails, which includes a front tube 1 and a rear tube 2 that are hinged to each other at a top to form a zigzag folding structure. There are a plurality of foldable foot pedals 11 on the front tube 1, and a folding method of the foot pedals 11 adopts the existing connection method. All foot pedals 11 are connected by connection rods 4, and through a parallelogram structure, all connection rods 4 are synchronously folded and opened. The rear tube 2 is provided with a support plate 5 corresponding to a topmost foot pedal 11. The support plate 5 is fixedly provided on the rear tube 2. When the foot pedals 11 are unfolded, the topmost foot pedal 11 will be supported on the support plate 5 and then connected by the connection rods 4 to maintain a flattened state of all foot pedals 11.

As shown in FIGS. 1 to 5, the front tube 1 and the rear tube 2 are arranged in a staggered manner in a front-and-rear direction, and two front tubes 1 are rotatably connected to inner sides of two rear tubes 2. After folding, the front tubes 1 and the rear tubes 2 have overlapping parts in a left-and-right direction. A top of the front tubes 1 is provided with an armrest frame 3. The armrest frame 3 of this embodiment adopts a double tube armrest frame, that is, the armrest frame 3 includes two vertical rods 31. The two vertical rods 31 are respectively inserted into interiors of the front tubes 1 and are in contact with and slidably fit with inner walls of the front tubes 1.

The vertical rods 31 are provided with an elastic locking member 7, and the elastic locking member 7 is provided with a cylindrical locking protrusion 71 and an elastic member. The locking protrusion 71 and the elastic member can be integrated, for example, using the existing method of combining a leaf spring with a protrusion, or it can be a split structure, using a spring and a locking protrusion 71. An outward moving force is applied to the locking protrusion 71. Both the vertical rods 31 and the front tubes 1 are provided with locking holes 12 configured for the locking protrusion 71 of the elastic locking member 7 to extend, and the elastic locking member 7 is provided inside the vertical rods 31. A head of the locking protrusion 71 of the elastic locking member 7 is spherical. Thus, it is easy to pass through the locking holes 12 of the vertical rods 31 and the front tubes 1.

The support plate 5 is provided with an unlocking member 6, and the unlocking member 6 is provided on a rotation trajectory of the locking holes 12. The unlocking member 6 has an unlocking protrusion 61, and the unlocking protrusion 61 is also cylindrical in shape. When folding between the front tubes 1 and the rear tubes 2, the unlocking protrusion 61 of the unlocking member 6 will be inserted into the locking holes 12 and compress the elastic locking member 7, thereby forcing the elastic locking member 7 to retract inward and exit from the locking holes 12 of the front tubes 1, thereby releasing a locking state of the front tubes 1 and the armrest frame 3, thereby achieving automatic retraction of the armrest frame.

In an implementation mode, the front tubes 1 and the rear tubes 2 are arranged to overlap in the front-and-rear direction, and the unlocking member 6 is an unlocking protrusion 61, and the unlocking protrusion 61 is provided on an outer wall surface of the rear tubes 2 facing the front tubes 1 (not shown in the figures).

In an implementation mode, the front tubes 1 and the rear tubes 2 are configured to be overlapped in the front-and-rear direction, and the unlocking member 6 is provided on an outer wall surface of the front tubes 1. The unlocking member 6 includes a fixing part 62 and a movable part 63, and the fixing part 62 wraps around an outer wall of the front tubes 1. The fixing part 62 is provided with a sliding groove 621 having an opening towards a side of the rear tubes 2. The movable part 63 is slidably fitted into the sliding groove 621. The movable part 63 is wrapped around an outer side of the front tubes 1, and the movable part 63 is provided with a slot hole configured for the front tubes 1 to pass through. A diameter of the slot hole is larger than a diameter of the front tubes, so that the movable part 63 can move forward and backward in the sliding groove 621.

The elastic locking member 7 is provided on an outer side of the front tubes 1, and both the front tubes 1 and the vertical rods 31 are provided with locking holes 12 that have openings at a front side. The elastic locking member 7 includes a locking protrusion 71 fixed on an inner wall of a front side of the movable part 63, and an elastic member 72 provided between an outer wall of a rear side of the front tubes 1 and an inner wall of a rear side of the movable part 63. Two ends of the elastic member 72 are respectively in contact with the inner wall of the rear side of the movable part 63 and the outer wall of the rear side of the front tubes 1.

In a natural state, the elastic member 72 causes the movable part 63 to move towards the rear tubes 2, allowing the locking protrusion 71 to be inserted into the locking holes 12 of the front tubes 1 and the vertical rod 31 in sequence from front to back, thereby achieving locking. When the front tubes 1 and the rear tubes 2 are folded and closed, the rear tubes 2 compresses the movable part 63, and the movable part 63 is moved forward, the locking protrusion 71 is caused to at least exit from the locking holes 12 of the vertical rods 31, thereby releasing a locking state of the armrest frame 3 and the front tubes 1.

Figure 10:
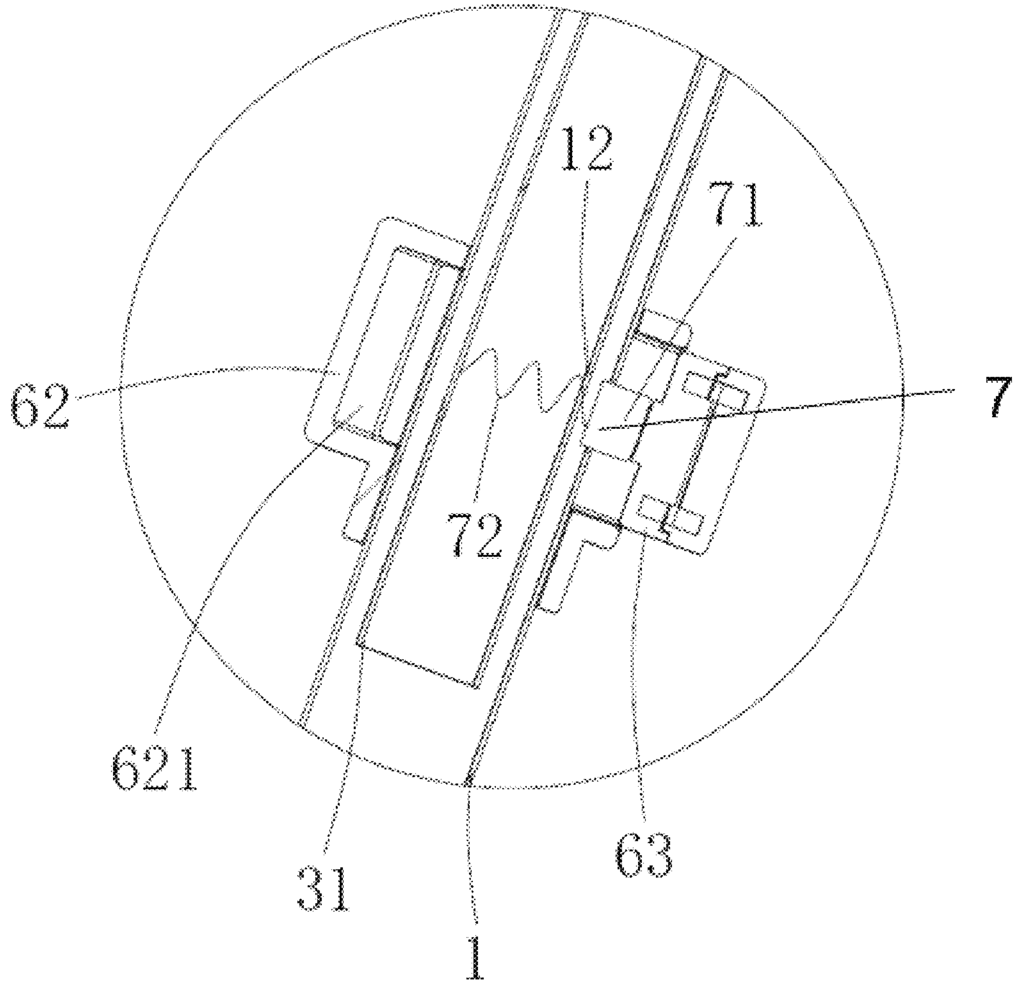
FIG. 10 is a cross-sectional view of yet one embodiment.

As shown in FIG. 10, in an implementation mode, the elastic locking member 7 is provided inside the vertical rods 31. The elastic locking member 7 can be a combination of a leaf spring and the locking protrusion 71, or a combination of an existing spring and the locking protrusion 71. The locking holes of the front tubes 1 and the vertical rods 31 both have openings towards a rear side. The locking protrusion 71 will directly compress an inner wall of a rear side of the movable part 63 after extending from the locking holes 12 of the front tubes 1, the movable part 63 is caused to move towards the rear tubes 2. An inner wall of a rear side of the movable part 63 is provided with an unlocking protrusion 61 that contacts the locking protrusion 71. When the front tubes 1 and the rear tubes 2 are folded and closed, the rear tubes 2 compresses the movable part 63, and the movable part 63 is caused to compress the elastic locking member 7 inward, so that the unlocking protrusion 61 enters the locking holes 12 of the front tubes 1, and the elastic locking member 7 is caused to exit from the locking holes of the front tubes 1, thereby releasing a locking state of the armrest frame 3 and the front tubes 1.

The armrest frame 3 can also adopt a single tube armrest frame, that is, only one vertical rod 31.

What is claimed is:

1. A ladder that facilitates a contraction of handrails, comprising:

a front tube and a rear tube that are hinged to each other at a top to form a zigzag folding structure;

an armrest frame, which is sleeved on the front tube, and a vertical rod of the armrest frame is inserted into the front tube and slides in cooperation with the front tube;

an elastic locking member that cooperates with the vertical rod, the elastic locking member can expand and contract elastically in a radial direction of the vertical rod, thereby achieving fixation or unlocking between the front tube and the vertical rod; and an unlocking member, which is provided on the rear tube;

when the front tube and the rear tubes are folded, the unlocking member acts on the elastic locking member to cause the elastic locking member to release a locking state of the front tube and the vertical rod, thereby achieving automatic contraction of the armrest frame;

wherein the front tube and the rear tube are arranged in a staggered manner in a front-and-rear direction, the elastic locking member is provided on the vertical rod, the front tube and the vertical rod are provided with locking holes configured for the elastic locking member to pass through;

the rear tube is provided with an extension portion that overlaps with the front tube in the front-and-rear direction, and the extension portion is provided with the unlocking member, and the unlocking member is an unlocking protrusion;

when the front tube and the rear tube are folded, the unlocking protrusion enters the locking holes, and the elastic locking member is caused to at least exit from the locking holes of the front tube to release a locking state of the armrest frame and the front tube.

2. The ladder according to claim 1, wherein the front tube is provided with a foot pedal, and the rear tube is provided with a support plate that supports the foot pedal when the ladder is unfolded;

wherein the support plate forms the extension part, and the unlocking member is provided on the support plate.

3. The ladder according to claim 1, wherein the handrail frame is a single tube handrail frame or a double tube handrail frame.

4. A ladder that facilitates a contraction of handrails, comprising:

a front tube and a rear tube that are hinged to each other at a top to form a zigzag folding structure;

an armrest frame, which is sleeved on the front tube, and a vertical rod of the armrest frame is inserted into the front tube and slides in cooperation with the front tube;

an elastic locking member that cooperates with the vertical rod, the elastic locking member can expand and contract elastically in a radial direction of the vertical rod, thereby achieving fixation or unlocking between the front tube and the vertical rod; and an unlocking member, which is provided on the front tube;

when the front tube and the rear tubes are folded, the unlocking member acts on the elastic locking member to cause the elastic locking member to release a locking state of the front tube and the vertical rod, thereby achieving automatic contraction of the armrest frame;

wherein the front tube and the rear tube are arranged to overlap in a front-and-rear direction, the elastic locking member comprises a locking protrusion and an elastic member, both the front tube and the vertical rod are provided with locking holes configured for the locking protrusion to pass through, and the unlocking member is provided on the front tube, wherein the unlocking member comprises:

a fixing part, which is fixedly provided on an outer wall of the front tube and is provided with a sliding groove having an opening towards the rear tube;

a movable part, which is slidably fit inside the sliding groove and wraps around an outer circumference of the front tube;

in a natural state, the elastic member applies elastic force to both the locking protrusion and the movable part, the locking protrusion is caused to pass through the locking holes of the front tube and the vertical rod, and the movable part is caused to move towards the rear tube;

when the front tube and rear tube are folded and closed, the rear tube compresses the movable part, and the locking protrusion is caused to exit from the locking holes of the front tube or/and the vertical rod to release a locking state of the armrest frame and the front tube;

wherein the locking protrusion is fixedly provided on an inner wall of a front side of the movable part, the elastic member is provided between the front tube and an inner wall of a rear side of the movable part, two ends of the elastic member are respectively in contact with an outer wall of the front tube and the inner wall of the rear side of the movable part, thereby directly applying elastic force to the movable part and cause the movable part to move toward the rear tube, so that the locking protrusion is inserted into the locking holes of the front tube and the vertical rod from front to rear;

when the front tube and the rear tube are folded and closed, the rear tube compresses the movable part, the locking protrusion is caused to at least exit from the locking holes of the vertical rod.

5. A ladder that facilitates a contraction of handrails, comprising:

a front tube and a rear tube that are hinged to each other at a top to form a zigzag folding structure;

an armrest frame, which is sleeved on the front tube, and a vertical rod of the armrest frame is inserted into the front tube and slides in cooperation with the front tube;

an elastic locking member that cooperates with the vertical rod, the elastic locking member can expand and contract elastically in a radial direction of the vertical rod, thereby achieving fixation or unlocking between the front tube and the vertical rod; and an unlocking member, which is provided on the rear tube;

when the front tube and the rear tubes are folded, the unlocking member acts on the elastic locking member to cause the elastic locking member to release a locking state of the front tube and the vertical rod, thereby achieving automatic contraction of the armrest frame;

wherein the front tube and rear tube are arranged to overlap in a front-and-rear direction, the elastic locking member is provided on the vertical rod, the front tube and vertical rod are provided with locking holes configured for the elastic locking member to pass through, and the unlocking member is an unlocking protrusion provided on an outer wall surface of the rear tube that faces the front tube;

the unlocking protrusion is provided on a rotation path of the locking holes;

when the front tube and rear tube are folded, the unlocking protrusion enters the locking holes to cause the elastic locking member to at least exit from the locking holes of the front tube, thereby releasing a locking state of the handrail frame and front tube.

* * * * *